United States Patent
Klaver et al.

(10) Patent No.: US 12,036,926 B2
(45) Date of Patent: Jul. 16, 2024

(54) SETTABLE UNIT FOR INSTALLATION IN OR ON A VEHICLE

(71) Applicant: MCi (Mirror Controls International) Netherlands B.V., Woerden (NL)

(72) Inventors: Gerardus Johannes Maria Klaver, Montfoort (NL); Bastiaan Huijzers, Dordrecht (NL)

(73) Assignee: MCI (MIRROR CONTROLS INTERNATIONAL), Netherlands B.V. Woerden (NL)

( * ) Notice: Subject to any disclaimer, the term of this patent is extended or adjusted under 35 U.S.C. 154(b) by 398 days.

(21) Appl. No.: 17/273,907

(22) PCT Filed: Sep. 10, 2019

(86) PCT No.: PCT/NL2019/050585
§ 371 (c)(1),
(2) Date: Mar. 5, 2021

(87) PCT Pub. No.: WO2020/055243
PCT Pub. Date: Mar. 19, 2020

(65) Prior Publication Data
US 2021/0237649 A1 Aug. 5, 2021

(30) Foreign Application Priority Data

Sep. 10, 2018 (NL) .................................. 2021597

(51) Int. Cl.
*B60R 1/072* (2006.01)
*B60R 1/074* (2006.01)
(Continued)

(52) U.S. Cl.
CPC .............. *B60R 1/072* (2013.01); *B60R 1/074* (2013.01); *B60R 16/023* (2013.01); *B60R 16/0315* (2013.01)

(58) Field of Classification Search
CPC ....... B60R 1/072; B60R 1/074; B60R 16/023; B60R 16/0315; B60R 16/005;
(Continued)

(56) References Cited

U.S. PATENT DOCUMENTS

| 4,101,206 A | 7/1978 | Oskam et al. |
|---|---|---|
| 2003/0169160 A1 | 9/2003 | Rodriguez Barros et al. |

(Continued)

FOREIGN PATENT DOCUMENTS

| CN | 1213346 A | 4/1999 |
|---|---|---|
| CN | 1339000 A | 3/2002 |

(Continued)

*Primary Examiner* — Balram T Parbadia
*Assistant Examiner* — Rahman Abdur
(74) *Attorney, Agent, or Firm* — Volpe Koenig (57) ABSTRACT

An adjustable exterior mirror on a vehicle, or another kind of settable unit for installation in or on the vehicle, signals a sensor signal via the current through the current conductors for the supply current of a motor, heating or other function holder in the vision unit. In response to external switching-on of a supply voltage between the current conductors, for example from the vehicle, an aspect of the current is sensor-dependently controlled from the settable unit. In the vehicle, the aspect of the current through at least one of the current conductors is measured during a delay time interval after switching-on of the supply voltage to read out the sensor result.

16 Claims, 3 Drawing Sheets

(51) Int. Cl.
*B60R 16/023* (2006.01)
*B60R 16/03* (2006.01)

(58) Field of Classification Search
CPC .............. B60R 16/03; B60Y 2200/11; B60Y 2400/301; B60Y 2410/10
USPC ........................................................ 359/877
See application file for complete search history.

(56) References Cited

U.S. PATENT DOCUMENTS

| | | | |
|---|---|---|---|
| 2006/0061008 A1* | 3/2006 | Karner | B60R 1/06 264/250 |
| 2009/0295199 A1 | 12/2009 | Kincaid et al. | |
| 2013/0107386 A1* | 5/2013 | Sobecki | B60R 1/072 359/877 |

FOREIGN PATENT DOCUMENTS

| | | | | |
|---|---|---|---|---|
| CN | 203255055 U | 10/2013 | | |
| DE | 3820578 A1 | 2/1989 | | |
| EP | 1431121 A2 | 6/2004 | | |
| EP | 3305600 A1 | 4/2018 | | |
| JP | 2005080492 A | 3/2005 | | |
| WO | 2012047104 A1 | 4/2012 | | |
| WO | 2016/080834 A2 | 5/2016 | | |
| WO | WO-2016080834 A2 * | 5/2016 | ............. | B60R 1/072 |

* cited by examiner

SETTABLE UNIT FOR INSTALLATION IN OR ON A VEHICLE

CROSS REFERENCE TO RELATED APPLICATIONS

This application is a 35 USC § 371 National Stage application of International Patent Application No. PCT/NL2019/050585, which was filed Sep. 10, 2019, entitled "SETTABLE UNIT FOR INSTALLATION IN OR ON A VEHICLE" which claims priority to Netherlands Patent Application No. 2021597, filed Sep. 10, 2018 and is incorporated herein by reference as if fully set forth.

FIELD OF THE INVENTION

The invention relates to a settable unit for installation in or on a (motor) vehicle, for example with a movable component, such as an adjustable exterior mirror on a car. The invention further relates to a vehicle provided with such a settable unit and an adjusting instrument for use in such a settable unit.

BACKGROUND

Settable units for installation in or on a (motor) vehicle are known per se. An example of a settable unit is a vision unit. In a simple form, the vision unit is a rearview mirror for use outside on a vehicle. In a use position, the vision unit can serve to provide the driver with vision of what is happening next to and behind the vehicle, for example in that a vision unit includes mirrors facing sidewards or rearwards, or cameras cooperating with displays in the vehicle. The vision unit may include function holders such as an adjusting instrument for fine setting of the orientation of the mirror or camera, mirror heating, mirror glass adjusters, a direction indicator, and so forth. The vision unit may also serve to provide a board control unit with information, as for example in the case of a fully or partially self-driving vehicle. The vision unit may include further function holders in the form of one or more sensors such as a camera, a lidar sensor, a radar sensor and/or other sensors.

In an embodiment, an adjusting instrument may be used to fold the vision unit between a use position, in which a vision unit extends from the side of the vehicle in an outward direction, and a park position, in which a vision unit extends as much as possible along the vehicle. The park position serves to make the vehicle narrower in parked position, and to guard a vision unit from damage.

The adjusting instrument is usually placed between the vision unit, which is in a vision unit housing, and a supporting foot fixedly connected to the vehicle. The adjusting instrument contains for example an adjustment shaft which is fixedly attached to the supporting foot and which extends more or less vertically with respect to the base surface of the vehicle, a drive train, and an adjusting frame which are connected to or are part of a vision unit.

For the energization, operation and readout of the different function holders, connections are needed to connect the function holders, upon installation in or on the vehicle, to the electronics in the vehicle. It is customary to lead the current conductors to the supporting foot through the adjustment shaft, which is configured to be hollow for that purpose. Increase of the number of current conductors influences the necessary diameter of the adjustment shaft, and is hence (co-)determinative of the dimensions of the adjusting instrument and of the dimensions of a vision unit. A large vision unit is aerodynamically disadvantageous.

It is desirable to provide the adjusting instrument with a sensor to detect the reaching of the use position and to communicate with the driver or onboard unit. More generally, for other settable units for installation in or on a vehicle that are provided with current conductors to supply the function holders with power it is also desirable to provide them with a sensor to detect a state of the settable unit and communicate with the driver or onboard unit.

SUMMARY

It is an object, among others, to limit the number of electric current conductors for connection to a settable unit for installation in or on a vehicle.

It is a further object, among others, to limit the number of electric current conductors in an adjustment shaft of a settable unit.

It is an object, among others, to limit the number of electric current conductors in the adjustment shaft of the vision unit.

There is provided a settable unit for installation on or in a vehicle, including
  a sensor, for detection of a state of a component of the settable unit;
  a function holder driven by electric supply current, which is configured to set the settable unit;
  an electric current conductor for supplying the supply current to the function holder;
  a switch, in series with the electric current conductor and the function holder;
  a delay circuit configured to make the switch conductive with a delay after rise of an electric voltage on the current conductor;
  a signaling circuit configured to set an aspect of the current through the current conductor during the delay, depending on a sensor result of the sensor.

In the case where the above-mentioned component forms a movable part of the settable unit, and the function holder and the sensor are in or on the movable part, the electric current conductor can run through an adjustment shaft to the moving part. In this case, there is less space needed in the adjustment shaft, because the sensor result can be read out via the electric current conductor. But also if the function holder and the sensor are in a fixed part, the fact that the sensor result can be read out via the electric current conductor simplifies the installation of the settable component.

This makes it possible to pass sensor detection results in a simple manner to external electronics, for example to electronics in a fixed component of the settable unit on which a movable component has been arranged, or electronics in a part of the vehicle in which or on which the settable unit has been arranged, without extra current conductors being needed for this.

A function holder, such as a motor of a mirror adjustment mechanism, of a camera adjustment mechanism, a light source of a direction indicator, a camera or mirror heating and so forth, must fulfill its function (rotating a motor shaft, emitting light, generating heat), in principle, for a prolonged time after rise of the electric voltage, that is, after the supply voltage reaches an effective level at which the function works. This is not appreciably influenced by a short delay of the switching-on of the current with which the function holder is supplied. This makes it possible to pass sensor detection results to electronics in the vehicle without extra current conductors being needed for this.

As aspect of the current for the signaling, preferably the current level is used. This can be realized with simple means. But it is also possible to use other aspects such as presence or absence of a modulation, or modulation aspects such as a modulation frequency. The function holder and the sensor are different components of the settable unit, and thus the magnitude of the supply current that runs through the function holder is not the above-mentioned aspect with which the sensor result is signaled.

The aspect of the current is adjusted separately from (and preferably independently of) the supply current through the function holder. In the case where the function holder is the motor or a heating, the motor current and the heating current, respectively, is not the aspect involved.

In an embodiment, the sensor is an orientation sensor, for example for detection of an orientation of a vision unit housing with respect to an adjustment shaft. Such a sensor can be used to determine whether a required orientation has been reached, without an extra current conductor being needed for this. Preferably, the function holder whose current conductor is used for signaling is an adjusting instrument for adjustment of the orientation concerned. In this way, based on the signaling, it can be directly controlled whether the supply current after rise has to stay on. The rotation is for example a rotation of a vision unit housing around the adjustment shaft.

There is provided a settable unit, including
a movable part comprising
a sensor, for detection of a state of the actuator;
a function holder driven by electric supply current;
an electric current conductor for supplying the supply current to the function holder;
a switch, in series with the electric current conductor and the function holder;
a delay circuit configured to make the switch conductive with a delay after rise of an electric voltage on the current conductor;
a signaling circuit configured to set an aspect of the current through the current conductor during the delay, depending on a sensor result of the sensor.

According to another aspect, there is provided an adjustable vision unit for a vehicle, in particular a motor vehicle, comprising
a vision unit housing;
a sensor in the vision unit housing, for detection of a state of the vision unit;
a function holder in the vision unit housing, driven by electric supply current;
an electric current conductor for supplying the supply current to the function holder;
a switch, in series with the electric current conductor and the function holder;
a delay circuit configured to make the switch conductive with a delay after rise of an electric voltage on the current conductor;
a signaling circuit configured to set an aspect of the current through the current conductor during the delay, depending on a sensor result of the sensor.

According to another aspect, there is provided a method for sensor-dependently controlling a settable unit on or in a vehicle, wherein the settable unit includes current conductors for supply of supply current from the vehicle to a function holder of the settable unit, for example for setting a position or orientation of a moving part of the settable unit, the method comprising the steps of
switching on a supply voltage between the current conductors; and
detecting a signaling of a sensor result of a sensor, by means of a measurement of an aspect of the current through at least one of the current conductors during a delay time interval after switching-on of the supply voltage.

According to another aspect, there is provided a method for signaling a sensor result from a settable unit in or on a vehicle, which settable unit includes current conductors for supplying a function holder in the settable unit, and wherein the method comprises the steps of
after rise of an electric voltage between the current conductors, delaying of passing an electric supply current from the current conductors to the function holder;
setting an aspect of a current through at least one of the current conductors during the delay, depending on the sensor result.

According to another aspect, there is provided a method for sensor-dependently controlling an adjustable vision unit on a vehicle, in particular a motor vehicle, wherein the vision unit includes current conductors for supply of supply current from the vehicle to a function holder in the vision unit, wherein the method comprises the steps of
from the vehicle, switching on a supply voltage between the current conductors; and
detecting a signaling of a sensor result of a sensor in the vision unit, by means of a measurement of an aspect of the current through at least one of the current conductors during a delay time interval after switching-on of the supply voltage.

According to another aspect, there is provided a method for signaling a sensor result to a vehicle from an adjustable vision unit on the vehicle, which vision unit includes current conductors for supplying a function holder in the vision unit, and wherein the method comprises the steps of
after rise of an electric voltage between the current conductors, delaying of passing an electric supply current from the current conductors to the function holder;
setting an aspect of a current through at least one of the current conductors during the delay, depending on the sensor result.

BRIEF DESCRIPTION OF THE FIGURES

These and other objects and advantageous aspects will be apparent from a detailed description of exemplary embodiments with reference to figures, in which there is shown in
FIG. 1 a vision unit for use on a vehicle.

DETAILED DESCRIPTION

Figure 1:
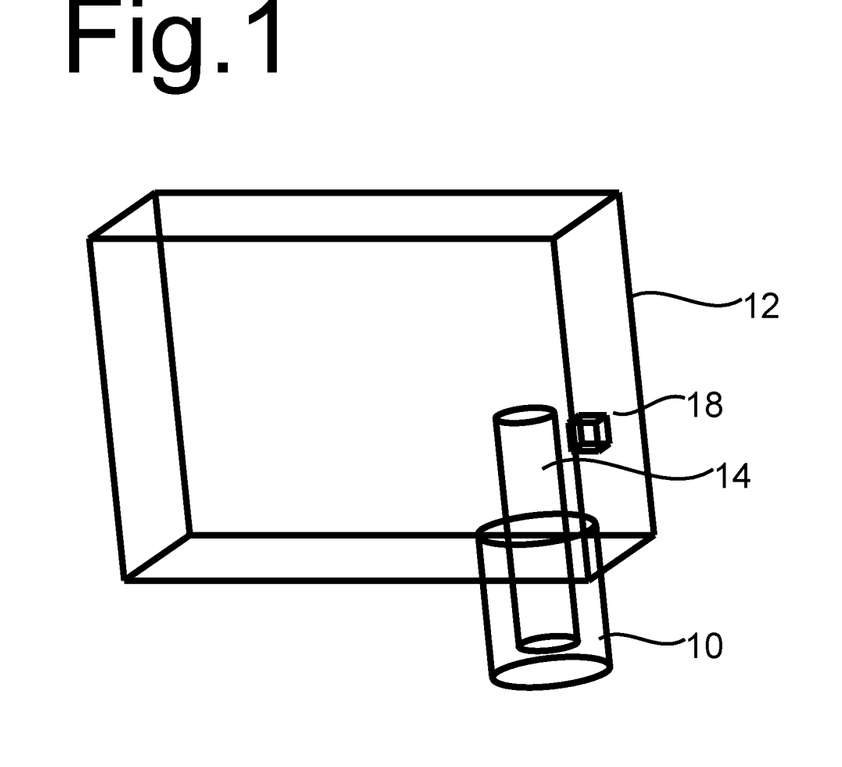

FIG. 1 shows a vision unit on a vehicle, with a supporting foot 10 fixedly connected to the vehicle, and a vision unit housing 12, by way of example of a settable unit for mounting on or in a vehicle. The vision unit includes an adjusting instrument provided with an electric motor, a drive train and an adjusting frame (not shown), which are in vision unit housing 12, and an adjustment shaft 14 which is fixedly mounted to supporting foot 10 and extends substantially vertically when the vision unit is mounted on the vehicle. The electric motor is provided with electric current via current conductors (for example wiring) which run via adjustment shaft 14 from vision unit housing 12 to supporting foot 10.

The vision unit further includes a sensor 18 to detect whether the adjusting element has reached a use position. Sensor 18 can for example include a microswitch. Information about the sensor signal of sensor 18 is passed on via the same current conductors as is the electric current for drive of the electric motor. In an embodiment, this is done during a predetermined time interval prior to switching-on of the electric motor.

Figure 1A:
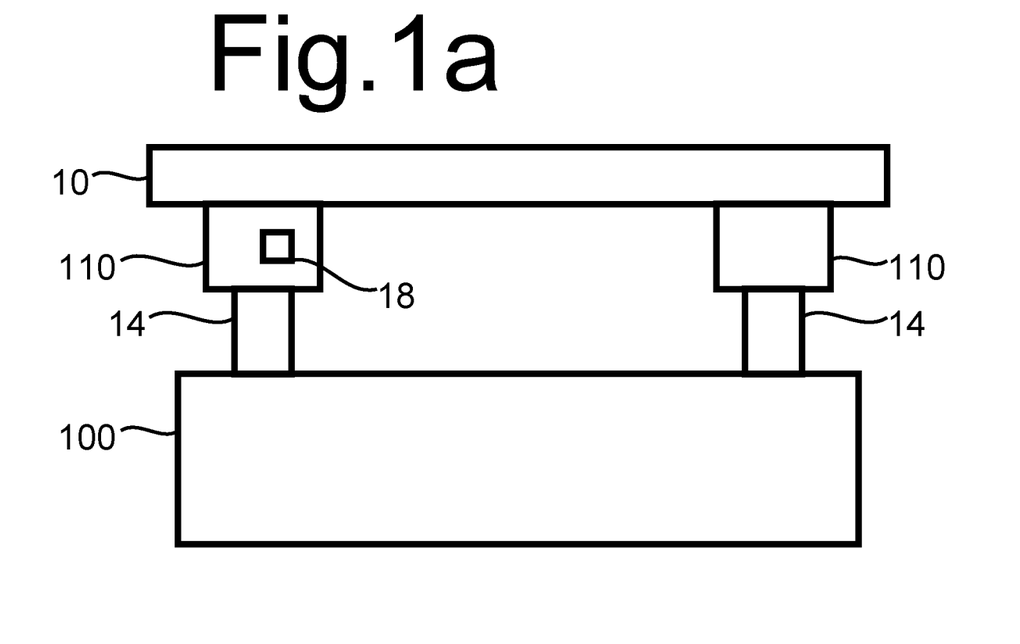
FIG. 1a a movable aerodynamic structure for use on a vehicle.

While FIG. 1 by way of example shows a vision unit such as a rearview mirror, a same kind of actuator with current conductors to a moving part such as a vision unit housing can also be used for other applications. FIG. 1a shows the example of a settable unit with aerodynamic structure 100 as moving part on a supporting foot 10 with which the settable unit is connected to the vehicle. Such an aerodynamic structure 100 can be applied in a land vehicle such as a car for adjusting air streams along or through the vehicle, for example for reduction of air resistance or for cooling by aerodynamic structure 100.

Herein, aerodynamic structure 100 is attached to supporting foot 10 via motor housings 110 and adjustment shafts 14. In use, adjustment shafts 14 are driven by one or two motors in motor housings 110 to set the distance between aerodynamic structure 100 and supporting foot 10. One or both housings 110 include a sensor 18 to measure the extent to which adjustment shaft or shafts 14 have been slid out. The motors may be driven depending on the sensor result.

In the following, embodiments are described in which the settable unit is described by way of example as a vision unit, with the moving part of the actuator unit by way of example as a part thereof. But these examples serve at the same time as an example of other kinds of settable units such as actuator units and systems which include such a settable unit.

Figure 2:
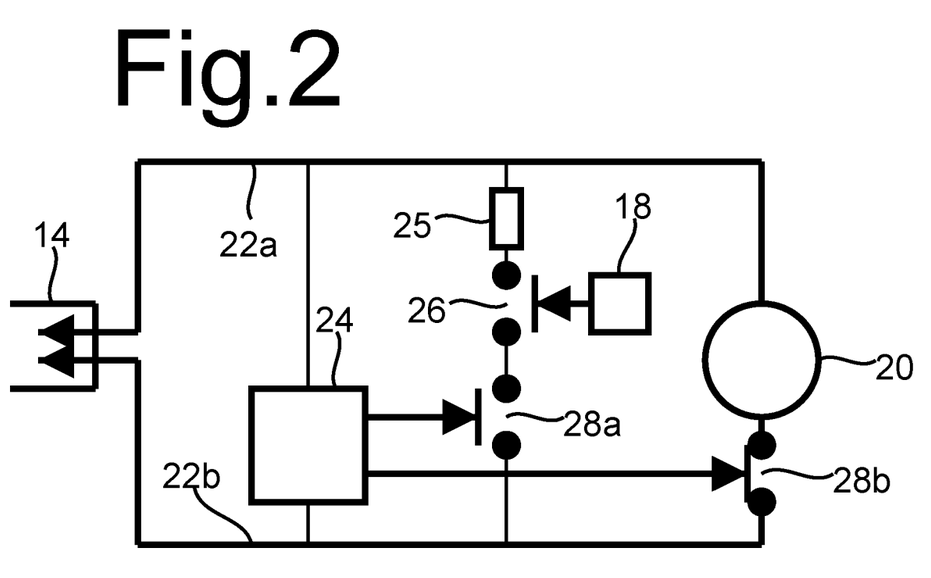
FIG. 2 a circuit for electric motor drive and sensor information relay.

FIG. 2 shows a circuit which is included in vision unit housing 12, or more generally in or on a moving part of a settable unit, for use of the same current conductors 22a,b for driving the electric motor 20 and passing on information about the sensor signal of sensor 18. The current conductors 22a,b run from the adjustment shaft 14 into the vision unit housing 12 or more generally the moving part of the settable unit, and therein are coupled to the electric motor 20. The circuit includes a delay circuit 24, a resistance 25, and a first, second and third switch 26, 28a, 28b. Second switch 28a is optional. Resistance 25, first and second switch 26, 28a are connected in series with each other. In a further embodiment, a further resistance (not shown) may be included parallel to a series connection of resistance 25 and first switch 26.

First switch 26 can be part of sensor 18, for example as a microswitch which is switched by a cam on adjustment shaft 14, but for the purpose of illustration first switch 26 and sensor 18 are shown as separate components. Second and third switch 28a, b can be implemented as switching transistors. Third switch 28b is connected in series with electric motor 20. Power supply inputs of delay circuit 24 are coupled to current conductors 22a,b, and delay circuit 24 has outputs coupled to control inputs of the second and third switch 28a,b. The series connection of third switch 28b and electric motor 20 is parallel to delay circuit 24 and the series connection of resistance 25, first and second switch 26, 28a.

Delay circuit 24 can include, for example, a timer circuit which is configured to start in an initial state upon rise of the supply voltage and to switch after a predetermined time interval. The rise of the supply voltage is the time at which the supply voltage reaches an effective level, for example a level at which electric motor 20 in normal use is driven, after having been zero or below the effective level. Implementations of such delay circuits 24 are known per se. The circuit can include, for example, a comparator (threshold circuit, in an embodiment a Schmidt trigger circuit), of which a first input is coupled to a junction in a resistive voltage divider which is coupled between the current conductors, and a second input to a junction in an integrated circuit which is coupled between the current conductors (for example, a junction in a series connection which includes a resistance and a capacitor in series).

In operation, delay circuit 24 starts when voltage between current conductors 22a,b rises from zero to a greater voltage value. At the start, delay circuit 24 enters an initial state. After a predetermined delay, delay circuit 24 switches from the initial state to the final state. In the initial state, delay circuit 24 keeps second switch 28a conductive and third switch 28b nonconductive. Thus, after the increase of the voltage in the initial state no current flows through electric motor 20. Whether current passes through the series connection of resistance 25, first and second switch 26, 28a depends on sensor 18. In the final state, delay circuit 24 keeps second switch 28a nonconductive and third switch 28b conductive, so that current can flow through electric motor 20, but not through the series connection of resistance 25, first and second switch 26, 28a.

In an embodiment, second switch 28a can be omitted, so that there is a permanent connection between first switch 26 and current conductor 22b. This has as a consequence that after switching-on of motor 20, parallel current between current conductors 22a,b can continue to run through resistance 25. This can lead to an increased power use but need not affect the functions otherwise. Adding second switch 28a saves energy.

Figure 3:
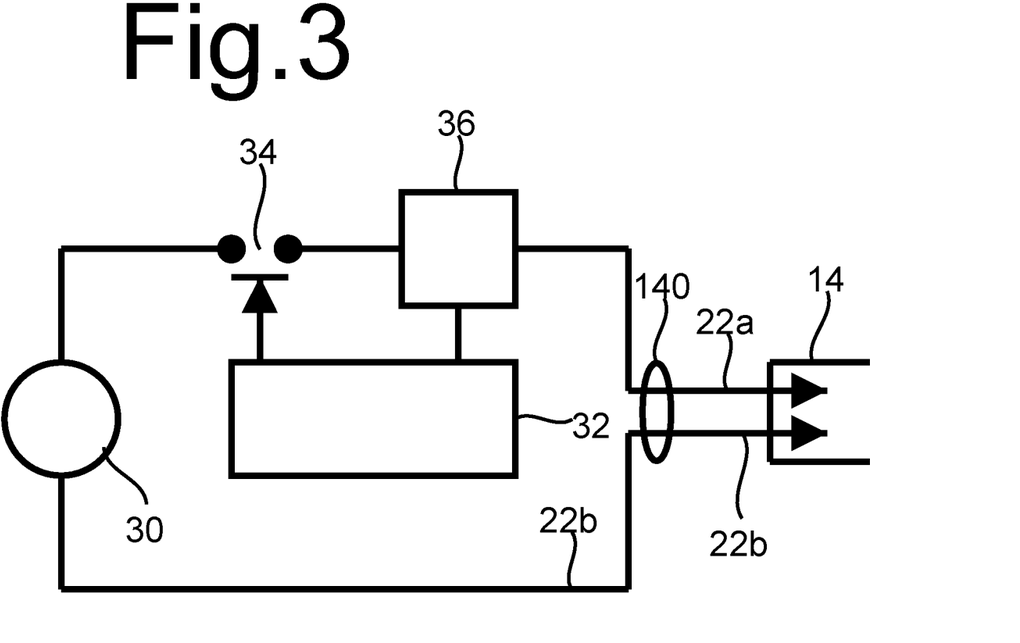
FIG. 3 a circuit for controlling the electric motor and reading out the sensor.

FIG. 3 shows a circuit which is included in the vehicle for controlling the electric motor and reading out the sensor. The circuit includes a voltage source 30, a control circuit 32, a switch 34 and a current detection circuit 36. Voltage source 30 is coupled in the vehicle via switch 34 and current detection circuit 36 to the current conductors 22a,b which run to the adjustment shaft 14 and therethrough to vision unit housing 12 or more generally the moving part of the settable unit. The ends of current conductors 22a,b here form the connection 140 to the settable unit. In an embodiment, the connection can include a connector to which current conductors 22a,b are coupled, or another connecting element, but the connection can also be formed by the ends of current conductors 22a,b themselves.

Control circuit 32 has an output coupled to a control input of switch 34 and an input coupled to current detection circuit 36. Control circuit 32 can include, for example, a microcomputer. Control circuit 32 is configured (for example, provided with a computer program) to read out information about the sensor signal from sensor 18 by rendering switch 34 conductive and reading out the detected current of current detection circuit 36 within a predetermined time interval after rendering the switch 34 conductive. This time interval is equal to, or shorter than, the predetermined delay of the delay circuit in the vision unit housing. Control circuit 32 is configured, if it is desired for the electric motor to start running, to leave switch 34 conductive also after the predetermined time interval. Control circuit 32 is configured, if it is not desired for the electric motor to start running, to render switch 34, after reading-out of the detected current, nonconductive.

Figure 4:
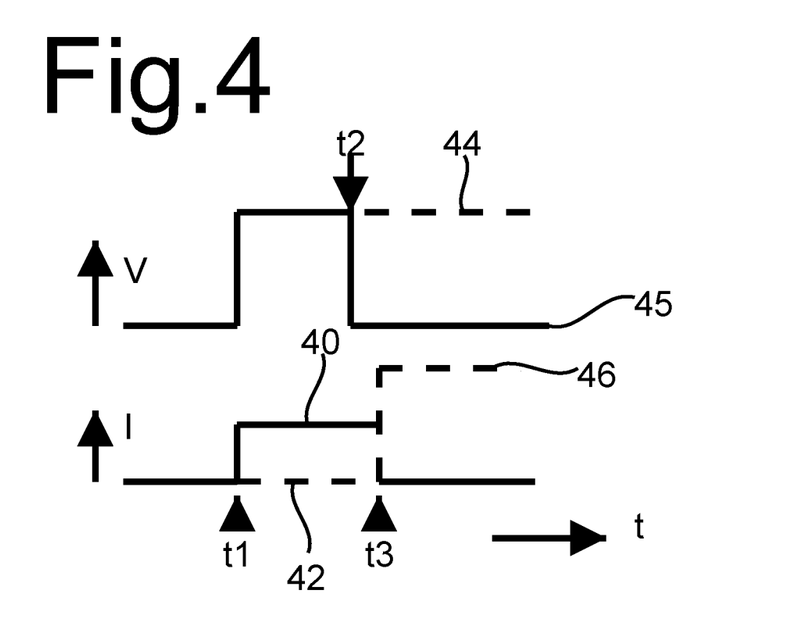
FIG. 4 voltage and current through the current conductors.

FIG. 4 shows a voltage difference V between current conductors 22a,b and a current I through current conductors 22a,b as a function of time t. At a time t1, control circuit 32 switches switch 34, on the side of the vehicle, to the conductive state. As a result of this, on the side of the vision unit, or more generally on the side of the moving part of the settable unit, delay circuit 24 starts in the initial state. Depending on the state of sensor 18 on the side of the vision unit or the moving part, a current then starts to flow, or not, through the series connection of resistance 25, and first and second switch 26, 28a, so that the current I either goes to a level 40 or remains on a zero level 42.

On the side of the vehicle, current detection circuit 36 detects the current I and control circuit 32 reads out the result of the current detection within a first predetermined time interval after the switching-on of switch 34. At the end of this first predetermined time interval, at a time t2, control circuit 32 switches switch 34 to the nonconductive state, if it is not desired for the electric motor to start running, so that the voltage V goes to a zero level 45. Or else, control circuit 32 leaves switch 34 conductive, so that the voltage V remains at a level 44.

On the side of the vision unit or the moving part, the delay circuit 24 at a time t3 switches to its final state, after a second predetermined time interval after switching-on of the voltage V, or sooner when delay circuit 24 drops out after the voltage goes to zero level 45. The second predetermined time interval is longer than the first predetermined time interval. As a result, third switch 28b becomes conductive after the second predetermined time interval and the current I goes to a motor current level 46 or to a zero level, depending on the voltage level 44, 45.

In this way, the current conductors 22a,b can be used both for reading out information about the sensor signal from sensor 18 and for driving the electric motor. The control circuit on the vehicle side determines whether voltage is applied between the current conductors 22a,b and the sensor 18 initially determines the resulting current. If driving of the electric motor is to be done depending on the information from the sensor, control circuit 32 can decide on this in the first time interval, before the electric motor gets current. The second predetermined time interval of the delay circuit can be chosen to be so short, for example shorter than one hundred milliseconds, that this hardly matters for the displacement of the motor.

In the embodiment shown, it is necessary that the current through the electric motor is zero before a sensor result of sensor 18 can be read out on the side of the vehicle. Thus, for repeatedly reading out the sensor result it may be necessary to interrupt the motor current. But when the sensor is used to confirm that the motor has reached the required use position, this requires no overhead. In an embodiment, control circuit 32, or another control circuit, switches the voltage supply via the current conductors 22a,b to the electric motor off when the motor current runs up, which is a consequence of the adjustment of the adjusting element being stopped against a stop. By thereafter applying the motor current at least during the first predetermined time interval between the current conductors 22a,b again, it can be confirmed with the sensor result from sensor 18 that the required use position has been reached, or that the earlier switching-off was a consequence of a temporary blockade, or was carried out too early, in which case control circuit 32 keeps the voltage at level 44 in order still to reach the required use position. Also if switching-off of the motor current does not occur on the basis of the motor current running up, but, for example, on the basis of a predetermined length of time that is needed to reach the required use position, the sensor result from sensor 18 is read out when the motor voltage has already been switched off for this reason.

If the vision unit or the moving part includes multiple adjusting instruments each with an electric motor which is supplied with current conductors that run through the adjustment shaft, and of which at least one current conductor serves exclusively for supply of that electric motor, current through each of those current conductors may be used to read out a sensor result, before the current is supplied to the electric motor concerned.

This can be used to read out different sensors, or to choose which current conductor will be used. Thus, if a first electric motor is driven by a first current conductor, the reading out of a sensor, which measures an effect of rotating of the first electric motor, can be executed via a second current conductor of a second electric motor, in a time interval after application of a voltage to that second current conductor. In this way, the current through the first electric motor does not need to be interrupted for reading out the sensor.

For example, if the vision unit includes a mirror glass adjuster for fine-adjustment of a mirror and an adjusting instrument to fold the vision unit, the sensor for detection of the required folding position can be read out via a current conductor for the electric motor of the fine-adjustment. In this way, the sensor can be read out without interrupting the current through the electric motor for folding. Because fine-adjustment mostly does not take place concurrently with folding, the fine-adjustment does not need to be interrupted for this, either.

This also holds more generally for other function holders with their own current conductors, whether they include electric motors or not, such as a mirror heating, a direction indicator and so forth. The readout of a sensor, which measures an effect of current through a first current conductor to a first function holder, can be measured via a second current conductor of a second function holder, in a time interval after application of a voltage to that second current conductor.

Instead of a sensor 18 to detect whether the adjusting element has reached a use position, also a sensor for another state may be used, for example for detection of whether a lens cap of a camera in the vision unit is fully open. For this, a microswitch, an angle sensor, for example a rotation potentiometer, a Hall sensor, an optical sensor or otherwise may be used. In this embodiment, the sensor result of the sensor may for example be signaled as aspect of the current over a current conductor to the camera, or over a current conductor for supply current to another function holder.

In an embodiment, multiple sensors may be used in the vision unit or the moving part of a settable unit, for example a first sensor for detecting whether the adjusting element has reached a use position and a second sensor for detection of whether the lens cap of the camera in the vision unit is fully open. In this embodiment, the sensor results of the different sensors are signaled as aspects of the current to different function holders, during delay times after rise of the supply voltage of the different function holders. The state of the lens cap and the adjusting element can be respectively signaled as aspects of current over current conductors for supply current to the camera and the motor of the adjusting element, respectively.

Also, a sensor for reading out the outside temperature, the mirror glass temperature or the camera temperature may be used, so that the vision unit or the moving part of the settable unit signals the signaled temperature to the electronics in the vehicle, and a mirror or camera heating can be controlled in an adjusted manner.

Other solutions are also possible. In another solution, the vision unit or the moving part of the settable unit includes a modulator (for example in the form of second switch 28) and a control circuit (in lieu of delay circuit 24) which is configured to control a modulation of the supply current through the function holder in response to the rise of the supply voltage (for example with a predetermined delay after the rise), depending on the sensor result. Resistance 25 and a first and second switch 26, 28*a* can be omitted in this solution and sensor 18 can be coupled to the input of the control circuit.

In an embodiment, the control circuit is configured to cause the modulator to pass the supply current initially and, depending on the sensor result, after a predetermined delay, temporarily interrupt or lower it or not. But other forms of modulation are also possible. In a further embodiment, the control circuit can control a time-dependent pattern of modulation with multiple interruptions or reductions of the supply current after rise of the supply voltage, which pattern the control circuit chooses depending on the sensor result of one or more sensors. This is especially useful when the supply current of slow-working function holders is modulated, for example of a heating.

In response to switching-on of a supply voltage between the current conductors from the vehicle, in this way an aspect of the current is sensor-dependently controlled from the vision unit or the moving part of the settable unit. In the vehicle, the aspect of the current through at least one of the current conductors is measured during a delay time interval after the switching-on of the supply voltage, to read out the sensor result.

It will be appreciated that departures from the embodiment shown are possible. Thus, the delay circuit may for example switch second and third switch 28*a,b* at different times and/or a parallel resistance may be used which continues to draw current if sensor 18 cuts off the current through resistance 25. Detection is possible as long as the currents concerned, with different sensor results, differ so much that current detection circuit 36 can distinguish them. First and second switch 26, 28*a* may also be put together. Together, they essentially constitute a logic AND connection (current with given sensor result AND delay circuit in initial state. But as is known to a person skilled in the art, such an AND function may be realized in different manners, or in more stages). If desired, it can be electrically separated from the motor circuit by means of an optocoupler.

While an embodiment has been shown in which the sensor result is signaled by means of a current level, it may be noted that this sensor result can also be signaled otherwise, for example by an average of a time-dependent current, or by the presence or absence of modulation of the current, or by a frequency of periodic modulation of the current. The average may be realized, for example, by sensor-dependent pulse width modulation of a periodic change of the current, the modulation may be controlled by sensor-dependent modulation (for example, modulation with a sensor-dependent amplitude of amplitude modulation), and the frequency may be realized by sensor-dependent frequency control of the modulation. In this case, current detection circuit 36 can be replaced with a corresponding detection circuit, such as a frequency detector, a modulation amplitude detector and so forth.

While a sensor with a microswitch has been described, other sensors are also possible. Sensor 18 may for example be implemented as an angle sensor, for example a rotation potentiometer, a Hall sensor, an optical sensor or otherwise. Such a sensor may for example be included in vision unit housing 12 or supporting foot 10, or between vision unit housing 12 and supporting foot 10, for detection of the angle of rotation of vision unit housing 12 relative to supporting foot 10. The current between current conductors 22*a,b* can run directly through such a sensor when the delay circuit 24 is in the starting state. As an alternative, a threshold circuit in the vision unit may be coupled to such a sensor to control first switch 26.

In an embodiment where the adjusting instrument is so constructed as to move the vision unit after reaching the operating position in axial direction up or down along the adjustment shaft, the axial movement can be used to switch the microswitch and thereby detect the proper reaching of the operating position.

The described embodiments in terms of a vision unit are more generally applicable to other kinds of settable units, for installation on or in a vehicle, such as movable aerodynamic elements for use on vehicles, and more generally settable units with a movable part which includes a sensor and a function holder, for example within a housing of the movable part or elsewhere on the movable part.

The invention claimed is:

1. A settable unit for installation on or in a vehicle, comprising
    a sensor that detects a state of a component of the settable unit;
    a function holder driven by an electric supply current, wherein the function holder is configured to move the settable unit;
    a current conductor that supplies the electric supply current to the function holder;
    a switch, in series with the current conductor and the function holder;
    a delay circuit configured to:
        detect a rise of an electric voltage on the current conductor, wherein the rise of electric voltages is a time at which a supply voltage reaches an effective level for operating the function holder;
        enter an initial state in response to the rise, wherein in the initial state electric current flowing through the current conductor is controlled based on the sensor, and
        after a predetermined delay has elapsed since entering the initial state, enter a final state, wherein in the final state current flows to the function holder flowing through the switch.

2. The settable unit according to claim 1, wherein the function holder contains an electric motor driven by the electric current.

3. The settable unit according to claim 1, wherein the component is a movable component and the function holder is configured to set an orientation and/or displacement of the movable component.

4. The settable unit according to claim 3, wherein the sensor is an orientation and/or displacement sensor, that detects an orientation and/or displacement of the movable component.

5. The settable unit according to claim 3, wherein the settable unit contains an adjustment shaft, around which the orientation is adjustable and/or along which displacement is adjustable, and wherein the current conductor runs through the adjustment shaft to the function holder in the movable component.

6. The settable unit according to claim 5, wherein the function holder moves the settable unit relative to the adjustment shaft.

7. The settable unit according to claim 6, wherein the function holder moves the settable unit via a drive train that converts rotation of an electric motor to rotation of the movable component of the settable unit around the adjustment shaft.

8. The settable unit according to claim 1, wherein in the initial state the sensor controls a current level of the electric current.

9. The settable unit according to claim 1, wherein the settable unit is an adjustable vision unit for the vehicle, comprising a rotatable vision unit housing, in which the sensor and the function holder are located.

10. A system comprising the settable unit according to claim 1, wherein the system comprises:
a control circuit which is coupled to the current conductor, wherein the control circuit is configured to switch on the current, to detect the current during the initial state, and the control circuit is configurable for, after detecting, switching the current off or not.

11. The system according to claim 10, wherein the system is a vision system for the vehicle.

12. The vehicle on which or in which the settable unit according to claim 1 is installed.

13. The settable unit according to claim 1, wherein the function holder is an electric motor for moving an element or rotating a shaft.

14. The settable unit according to claim 1, wherein the function holder is a light source for a direction indicator.

15. The settable unit according to claim 1, wherein the function holder is a heating element for heating a camera or mirror.

16. A method for signaling a sensor result from a settable unit in or on a vehicle, the method comprising
detecting, by a delay circuit, a rise of an electric voltage on a current conductor that supplies current to an electric motor, wherein the rise of electric voltages is a time at which a supply voltage reaches an effective level for operating the electric motor;
entering, by the delay circuit, an initial state in response to the rise, wherein in the initial state electric current is controlled based on a sensor; and
entering, by the delay circuit a final state after a predetermined delay has elapsed since entering the initial state, wherein in the final state current flows to the electric motor flowing through a switch, wherein the switch is in series with the current conduct and a function holder.

* * * * *